United States Patent
Yamazaki et al.

(10) Patent No.: US 6,286,055 B1
(45) Date of Patent: Sep. 4, 2001

(54) ERROR CORRECTION APPARATUS FOR NC MACHINE TOOL

(75) Inventors: Kazuo Yamazaki, 44204 Greenview Dr., El Macero, CA (US) 95618; Kyoichi Yamamoto, Niwa-gun, Aichi (JP); Sadayuki Matsumiya, Kawasaki (JP); Naoki Morita, Yamatokoriyama (JP)

(73) Assignees: Okuma Corporation, Nagoya; Mitutoyo Corportion, Kawasaki; Kabushiki Kaisha Mori Seiki Seisakusho, Yamatokiyama, all of (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/101,197
(22) PCT Filed: Nov. 7, 1996
(86) PCT No.: PCT/JP96/03268
  § 371 Date: Jul. 2, 1998
  § 102(e) Date: Jul. 2, 1998
(87) PCT Pub. No.: WO98/19824
  PCT Pub. Date: May 14, 1998

(51) Int. Cl.[7] .............. G05B 19/18; G01B 11/26; G06F 15/46; H01J 37/09; H01J 40/14
(52) U.S. Cl. ............. 710/1; 364/167.01; 364/474.35; 364/176; 408/8; 318/561
(58) Field of Search ............ 702/94; 364/167.01, 364/176, 474.35; 318/632, 561, 568.18, 571, 649, 560, 568.11; 356/358; 384/107; 451/567, 1; 359/202, 159; 372/98; 409/80, 132; 369/44.36, 212, 368, 364; 250/206.2; 348/92

(56) References Cited

U.S. PATENT DOCUMENTS

| | | | |
|---|---|---|---|
| 2,924,768 | * 2/1960 | Farrand et al. | 364/167.01 |
| 2,937,325 | * 5/1960 | Garber | 702/94 |
| 3,039,032 | * 6/1962 | Fowler | 364/176 |
| 3,634,662 | * 1/1972 | Slawson | 364/474.35 |
| 3,668,501 | * 6/1972 | Chitayat | 318/632 |
| 3,756,722 | * 9/1973 | Wetzel | 356/358 |

(List continued on next page.)

FOREIGN PATENT DOCUMENTS

| | | | |
|---|---|---|---|
| 4021603A1 | * 2/1991 | (DE) | G05B/19/415 |
| 0049153A2 | * 4/1982 | (EP) | G05B/19/40 |
| 61-209854 | 9/1986 | (JP) . | |
| 6-116250 U | 7/1988 | (JP) . | |
| 4-130209 | 5/1992 | (JP) . | |
| 06235620A | * 8/1994 | (JP) | G01B/11/24 |
| 06349435A | * 12/1994 | (JP) | H01J/37/09 |
| 07055640A | * 3/1995 | (JP) | G01M/11/02 |
| 10339804A | * 12/1998 | (JP) | G02B/5/18 |

OTHER PUBLICATIONS

Bahram Javidi, Optical Neural Nets, J. Webster (ed.), Wiley Encyclopedia of Electrical and Electronics Engineering Online, 1999.*

Primary Examiner—Thomas Lee
Assistant Examiner—Katharina Schuster
(74) Attorney, Agent, or Firm—Oliff & Berridge, PLC

(57) ABSTRACT

There is here disclosed a movement error compensating device for a movable unit such as a slider in a numerical control machine tool. A laser beam is emitted from a reference position beam generator installed on a fixed base in the movement direction of the slider. The slider is provided with a beam passing position detector, which detects a deviation on YZ planes of the laser beam. In order to properly detect the irradiation direction of the laser beam, the fixed base is equipped with a movement end beam position detector.

10 Claims, 6 Drawing Sheets

U.S. PATENT DOCUMENTS

| | | | |
|---|---|---|---|
| 3,817,647 | * | 6/1974 | Lemelson .................................. 408/8 |
| 4,193,644 | * | 3/1980 | Miyashita et al. .................... 384/107 |
| 4,491,776 | * | 1/1985 | Veale ..................................... 318/561 |
| 4,499,546 | * | 2/1985 | Kuga et al. ...................... 364/474.35 |
| 4,505,074 | * | 3/1985 | Kogure ..................................... 451/5 |
| 4,514,813 | * | 4/1985 | Nozawa et al. ................. 364/474.35 |
| 4,628,441 | * | 12/1986 | Johnstone et al. .............. 364/167.01 |
| 4,908,555 | * | 3/1990 | Ikeda et al. ........................... 318/567 |
| 4,931,962 | * | 6/1990 | Palleiko ................................. 702/94 |
| 4,988,935 | * | 1/1991 | York ................................ 318/568.18 |
| 5,021,941 | * | 6/1991 | Ford et al. ............................ 364/176 |
| 5,048,953 | * | 9/1991 | Kuo et al. ............................ 356/153 |
| 5,153,490 | * | 10/1992 | Ueta et al. ........................... 318/571 |
| 5,185,676 | * | 2/1993 | Nishiberi .............................. 359/202 |
| 5,265,027 | * | 11/1993 | Sasaki et al. .................... 364/474.36 |
| 5,418,810 | * | 5/1995 | Eguchi et al. ........................... 372/98 |
| 5,448,391 | * | 9/1995 | Iriyama et al. ....................... 359/159 |
| 5,492,440 | * | 2/1996 | Spaan et al. ............................. 409/80 |
| 5,583,837 | * | 12/1996 | Ogino et al. ...................... 369/44.36 |
| 5,627,670 | * | 5/1997 | Minoura et al. ...................... 359/212 |
| 5,640,270 | * | 6/1997 | Aziz et al. ............................ 359/368 |
| 5,661,560 | * | 8/1997 | Ozaki ................................... 356/364 |
| 5,678,964 | * | 10/1997 | Dashevsky ........................... 409/132 |
| 5,698,843 | * | 12/1997 | Phak ................................. 250/206.2 |
| 5,721,587 | * | 2/1998 | Hirose ................................... 348/92 |
| 5,808,740 | * | 9/1998 | Tanaka et al. ........................ 356/358 |
| 5,828,456 | * | 10/1998 | Aoki et al. ........................... 356/358 |
| 5,910,721 | * | 6/1999 | Hayashi et al. ...................... 318/649 |
| 5,952,804 | * | 9/1999 | Hamamura et al. ................. 318/560 |
| 6,097,168 | * | 8/2000 | Katoh et al. .................... 318/568.11 |

* cited by examiner

ERROR CORRECTION APPARATUS FOR NC MACHINE TOOL

BACKGROUND OF THE INVENTIONS

1. Field of the Invention

The present invention relates to an error compensating device for calibrating a movement accuracy of a movable unit of a numerical control machine tool and successively compensating an error during its movement.

2. Description of the Prior Art

For recent numerical control machine tools, high working precision is intended, and many new technologies have been developed and utilized. The new technologies are based on the concept of a machine tool structure having a high rigidity in order to prevent dynamic movement disturbance from occurring even during a high-speed movement and a highly reproducible movement mechanism is employed so as to always exhibit similar behavior during the repetition of the movement. However, even when such a design countermeasure is taken, the movement error cannot be completely eliminated because of the thermal deformation of the machine tool structure or the like. Therefore, after the completion of the machine tool, a calibrating operation called calibration is usually performed as required at certain time intervals to measure machine movement errors, and the measurement results are stored and held in a numerical control device. In actually operating and controlling the machine tool, these errors are reflected in control information to compensate an operating command so that the actual movement may not cause the errors.

In a usual calibration method, special measuring apparatus such as a laser interferometer, a dial gauge or the like is mounted on the machine tool. However, it is difficult to collectively and automatically measure various movement errors such as roll, pitch, yaw or the like of a movement axis, the degree of movement parallelism, movement perpendicularity or the like and right angles among a plurality of movement axes or other movement errors. Therefore, a setting-up operation exclusive for each error measurement is manually performed, and errors are measured and verified taking a relatively long period of time (at least several hours) in the present situation.

Also, in a precise calibrating operation, when utilizing light measurement as a measuring means, in principle a distance is generally measured based on a light wavelength.

In the above calibration method, the machine tool is occupied during every calibrating operation, the method can not be used during normal working operation, and the machine operation rate is decreased. Therefore, the calibrating operation can not be performed frequently. Also, to prevent the measuring accuracy from being varied by external disturbances such as temperature variation or occurrence of vibration in the measuring environment during the measuring operation, a remarkably stable measuring environment needs to be secured.

Also, even the machine tool developed basing on the above-mentioned new design concept inevitably has an error which can not be eliminated so completely as the error caused by the machine thermal deformation. It is known that this error generally takes irregular and complicated behavior as time elapses. It is also known that this behavior variation gradually takes place for a comparatively long period of time from several ten minutes to several hours. Therefore, when the calibrating operation in the conventional method is carried out at time intervals from several ten minutes to several hours, the machine movement error can be effectively compensated. However, this is not actually possible in view of the secured operation rate of the machine tool.

Further, since the accuracy of measurement based on the light wavelength is easily affected by temperature, air turbulence, humidity or the like, there is a problem that the measurement can not be easily utilized in a general factory environment where machine tools are operating.

On the other hand, because a demand for improvement in product quality is getting severe year by year, development of new technology for solving these shortcomings of the conventional calibrating method is desired.

An object of the present invention is to solve the above-mentioned problems, to detect a spatial movement error of a machine tool changing with elapsed time caused by the thermal deformation of the machine tool, abrasion of a movement mechanism or deterioration of assembly accuracy in the normal operation condition including a working operation without being influenced even by the general factory environment, to control the movement of the machine tool while compensating the machine movement error based on the result of detection, and to operate the machine tool with high accuracy.

SUMMARY OF THE INVENTION

The present invention has been developed in order to solve the above-mentioned problems.

The first aspect of the present invention is directed to an error compensating device in a numerical control machine tool which comprises a movable unit position detecting means for detecting a position along a predetermined control axis of a movable unit controlled along the axis, a movement condition detecting means for detecting a movement condition of the movable unit, a movement error calculating means for calculating a machine movement error by the use of the movement condition, and a movement error compensating means for compensating the movement error on the basis of the movement error.

The second aspect of the present invention is directed to the error compensating device which has a first movement condition memory means for previously storing the movement condition to be detected by the movement condition detecting means and wherein the movement error calculating means has a function of calculating the movement error from a difference between the movement condition stored in the first movement condition memory means and the movement condition at the present time.

The third aspect of the present invention is directed to the error compensating device which has a second movement condition memory means for storing, as required, the movement condition detected by the movement condition detecting means and wherein the movement error calculating means has a function of calculating the movement error from a difference between the movement condition stored in the second movement condition memory means and the movement condition at the present time.

The fourth aspect of the present invention is directed to the error compensating device wherein the movement error compensating means has a function of performing continuous compensation of the machine movement error by adding an error compensation quantity to a position command value.

The fifth aspect of the present invention is directed to the error compensating device wherein the movement condition detecting means detects displacement of the movable unit at a specific point in a direction of a movement axis from a movement basis on a coordinate axis different from the movement axis, and the movement error calculating means calculates the movement error on the basis of the detected displacement.

The sixth aspect of the present invention is directed to the error compensating device wherein for the sake of the detection of the movement condition, there are used a reference position beam generator installed to generate a reference position beam in parallel with the direction of the movement axis, and a movable unit two-dimensional detecting element installed on the movable unit for detecting the displacement from the movement basis on the coordinate axis different from the movement axis by the use of the reference position beam from the reference position beam generator.

The seventh aspect of the present invention is directed to the error compensating device wherein the detection of the movement condition includes the detection of torsion of the movable unit on the movement axis based on the displacements from the movement basis which are separately detected at two movable unit two-dimensional detecting elements installed on one movable unit.

The eighth aspect of the present invention is directed to the error compensating device wherein a movement end two-dimensional detecting element for setting and adjusting the reference position beam is arranged at a movement end so as to be opposite to the reference beam generator.

The ninth aspect of the present invention is directed to the error compensating device wherein the movable unit two-dimensional detecting element has a function of allowing the reference position beam to pass therethrough and detecting a two-dimensional position through which the beam passes.

The tenth aspect of the present invention is directed to the error compensating device wherein for the movable unit two-dimensional detecting element, there are used a two-dimensional CCD and a beam splitter.

DESCRIPTION OF THE PREFERRED EMBODIMENTS

Hereinafter, an embodiment of the present invention will be described.

A numerical control machine tool is usually constituted of a combination of a plurality of movement axes in order to be three-dimensionally operable in a designated operation space. In an error compensating device according to the invention, as a principle, every time there arises a movement relative to each movement axis, it is detected for each axis to what degree the movement is deviated from a reference position. The detection result obtained for each axis is spatially synthesized, the compensation of each axis is continuously calculated for securing the movement accuracy of the machine tool at the time, and the machine movement is compensated and controlled by using the compensation.

Figure 1:
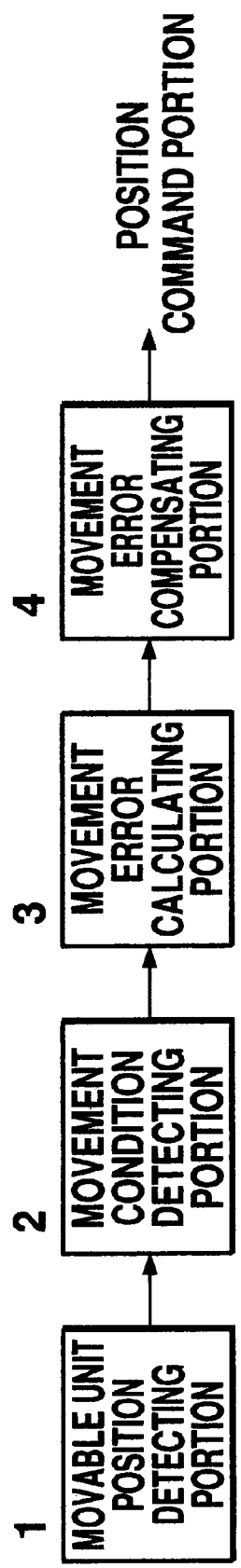
FIG. 1 is a block diagram of a first embodiment of an error compensating device in a numerical control device according to the present invention.

The error compensating device according to the invention is, as shown in FIG. 1, constituted of a movable unit position detecting portion 1 for detecting a position on each axis of the movable unit controlled along the axis, a movement condition detecting portion 2 for detecting the movement condition, i.e. how the movable unit is moving, a movement error calculating portion 3 for calculating a machine movement error from the movement condition, and a movement error compensating portion 4 for calculating an error compensation from the movement error for compensation.

Figure 2:
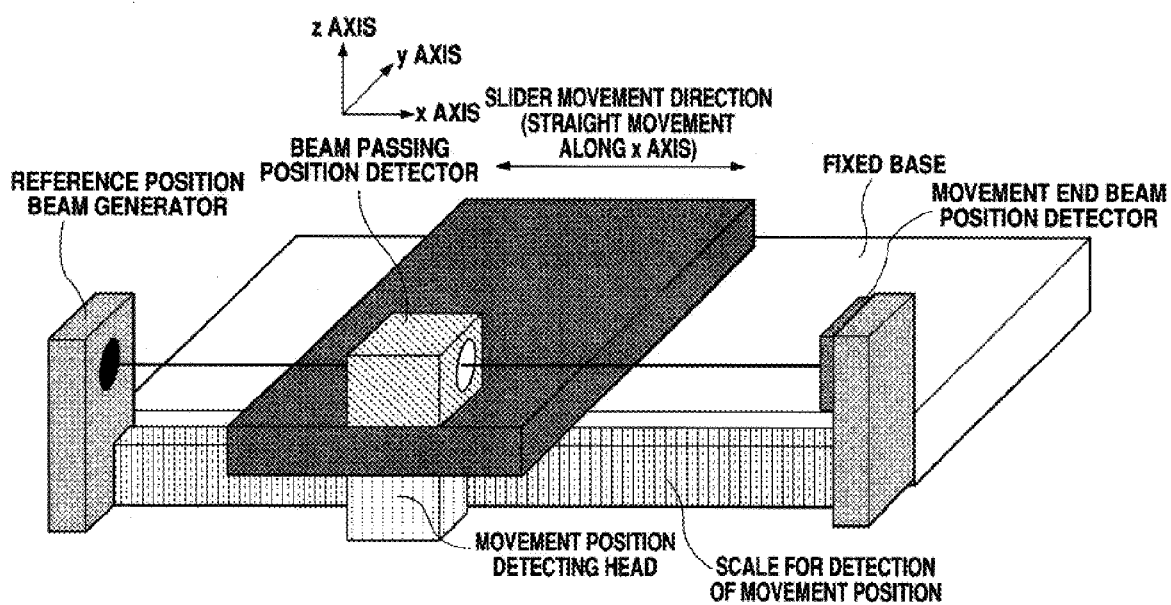
FIG. 2 shows an example of a movement condition detecting portion for one axis according to the invention.

The movable unit position detecting portion 1 is constituted to detect the movement position along each axis of a machine element (slider) moving along a movement axis. For example, to detect the movement condition along an X axis, as shown in FIG. 2, the movement position in an X-axis direction is detected using a rotary type position detector or the like attached to a linear scale, an X-axis ball screw or a motor. The present position of each axis slider is transmitted to the movement condition detecting portion 2.

Further, FIG. 2 shows an example in which the linear scale as a scale for detecting a movable unit position is attached to a fixed side, and a movable unit position detecting head is attached to a slider side to detect the movement position.

The movement condition detecting portion 2 receives the present position of each axis slider as an input from the movable unit position detecting portion 1, and at the same time detects on each movement axis how each machine element (slider) moving along the movement axis moves, by detecting a displacement of two axis coordinate values among the axis coordinate values of three axes (X, Y, Z) of a specified point on the slider at a certain moment. This displacement of two axis coordinate values is detected by detecting the deviation of each movement axis from a movement reference position, which is defined as the detection of movement condition.

In the example of FIG. 2, when a movement slider moves in an X-axis direction, a two-dimensional detecting element (beam position detecting element) is attached as a beam passing position detector on a specified point on the slider, in order to detect a difference between a spatial position in Y-axis and Z-axis directions of the specified point on the movement slider during or after movement, and a reference position. The reference position is produced by utilizing a light beam. Specifically, a reference position beam generator is attached so that a reference position beam is produced parallel with a movement direction in which an X-axis movement table is guided.

Also, a movement end beam position detector is attached opposite to the reference position beam generator for adjusting the setting of the reference position beam. The beam passing position detector and the movement end beam position detector have a function of specifying a position at which a beam is emitted in a two-dimensional plane. The detectors can be realized in various manners.

Figure 3:
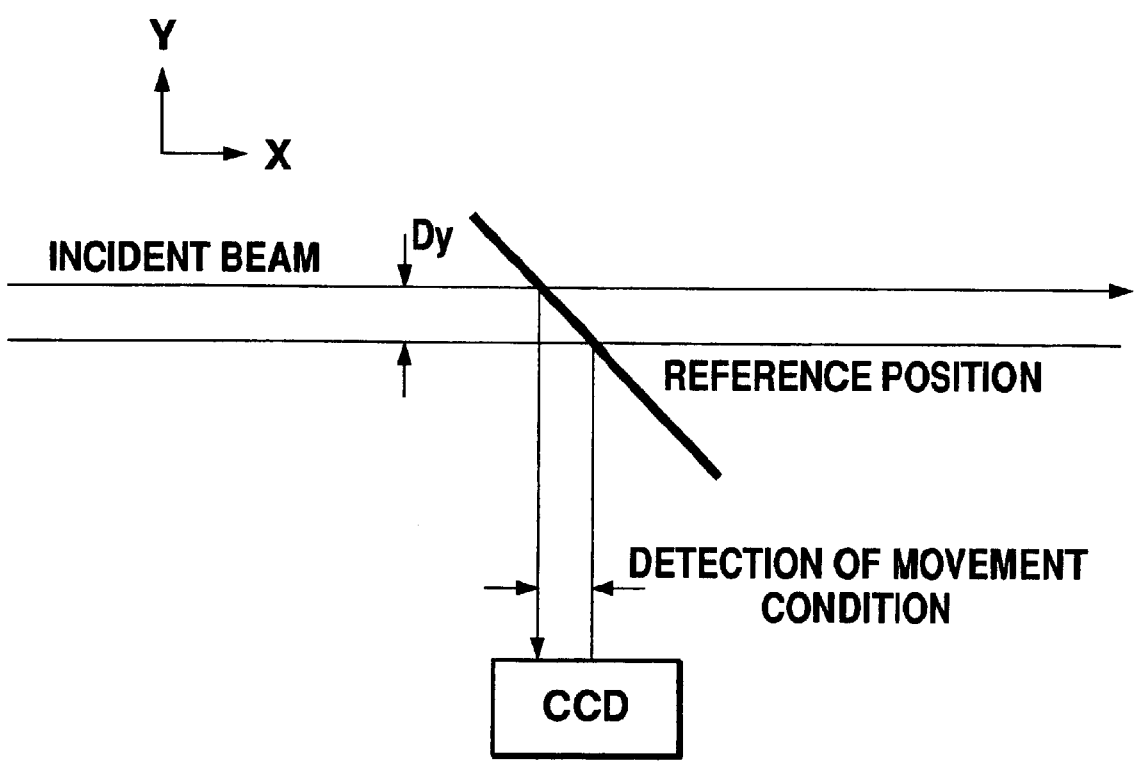
FIG. 3 shows an embodiment of a two-dimensional detecting element of a beam passing type according to the invention.

For example, they can be realized by using a two-dimensional CCD (charge coupled type solid state image element) as shown in FIG. 3. Since there is no CCD at present in which after a light beam is detected, the beam can pass through a detecting surface, in the example of FIG. 3 the beam passing position detector is constituted using a beam splitter (a light beam branch element for passing a part of an incident beam in a beam advancing direction as it is and refracting the remaining part in incident and perpendicular directions before passing).

Here, the incident beam advancing straight and parallel with the X axis is refracted by the beam splitter in the incident direction and the perpendicular direction, and the refracted incident beam is received by the CCD to detect the position of the beam. Therefore, when the slider shown in FIG. 2 is deviated to a Y-axis direction, as shown in FIG. 3 the incident beam is deviated from the original beam, and the deviation can be recognized from the reference position at which the CCD should originally receive the beam and a beam receiving position at which the CCD actually detects the beam.

It is understood that using the above-mentioned movable unit position detecting portion 1 and the movement condition detecting portion 2 for the X-axis movement of the machine tool, as the movement conditions, displacement quantities Dy(xc), Dz(xc) can be detected which indicate to what degree the passing position (ybc, zbc) of the reference beam is distant from the predetermined reference position (ybr, zbr) on a slider position xc at a certain point of time. Herein, Dy(xc) and Dz(xc) are respectively expressed as follows.

$$Dy(xc)=ybc(xc)-ybr(xc)$$

$$Dz(xc)=zbc(xc)-zbr(xc)$$

The reference position ybr, zbr used in the calculation may be set and stored beforehand corresponding to xc in the form of a reference table or an arithmetic function in the movement condition detecting portion 2. Also, when the setting of the reference position beam is deviated from the initially set position for some reason, the deviation of the beam position can be detected by the movement end beam position detector with a simple calculation in the same manner as described above. With regard to the setting of the reference beam position, the reference position beam generator and the movement end beam position detector may be installed in a spatial arrangement least likely to be affected by disturbance or the like.

As described above, the movement position xc is detected by the movable unit position detecting portion 1, and transmitted to the movement condition detecting portion 2 so as to be used to establish a correspondence between the movement condition and the movement position. The movement position xc and the corresponding displacement Dy(xc) and Dz(xc) are transmitted from the movement condition detecting portion 2 to the movement error calculating portion 3. Furthermore, displacement quantities Dye(x) and Dze(x) at movement ends detected by the movement end beam position detector are also transmitted to the movement error calculating portion 3.

The operation of the movement condition detecting portion 2 and the movable unit position detecting portion 1 has been described in accordance with an example of the movement along the X axis only, but this operation can also be realized, even when the machine tool is constituted of a plurality of movement axes. For example, in the case of a three axes machine tool having movement axes (X, Y, Z), the respective movement axes (X, Y, Z) are constituted as shown in FIG. 2, and the present positions xc, yc, zc of the movement are transmitted from the movable unit position detecting portion 1 to the movement condition detecting portion 2. The movement condition detecting portion 2 which has received these then detects the displacement at the present positions xc, yc, zc relating to X axis, Y axis and Z axis, and the displacement at the movement end of each axis.

Specifically, displacement quantities Dy(xc) and Dz(xc) as the movement condition relating to X-axis movement, and displacement quantities Dye(x) and Dze(x) as the beam position error at X-axis movement ends are detected. In the same manner, displacement quantities Dx(yc) and Dz(yc) as Y-axis movement condition, displacement quantities Dze(y) and Dze(y) as the beam position error at Y-axis movement ends, displacement quantities Dx(zc) and Dy(zc) as Z-axis movement condition, and displacement quantities Dze(z) and Dye(z) as the beam position error at Z-axis axial movement ends are obtained, respectively.

$$Dy(xc)=ybc(xc)-ybr(xc)$$

$$Dz(xc)=zbc(xc)-zbr(xc)$$

$$Dye(x)=yce(x)-yre(x)$$

$$Dze(x)=zce(x)-zre(x)$$

$$Dx(yc)=xbc(yc)-xbr(yc)$$

$$Dz(yc)=zbc(yc)-zbr(yc)$$

$$Dxe(y)=xce(y)-xre(y)$$

$$Dze(y)=zce(y)-zre(y)$$

$$Dx(zc)=xbc(zc)-br(zc)$$

$$Dy(zc)=ybc(zc)-ybr(zc)$$

$$Dxe(z)=xce(z)-xre(z)$$

$$Dye(z)=yce(z)-zre(z)$$

In the above equations respective components are defined as follows:

xc: the present position of a specified point (X-axis slider position) on a slider moving on the X axis (X-axis slider) obtained in the movable unit position detecting portion for the X axis;

yc: the present position of a specified point (Y-axis slider position) on a slider moving on the Y axis (Y-axis slider) obtained in the movable unit position detecting portion for the Y axis;

zc: the present position of a specified point (Z-axis slider position) on a slider moving on the Z axis (Z-axis slider) obtained in the movable unit position detecting portion for the Y axis;

ybc(xc): a y-directional beam passing position coordinate value on a detector when an X-axis reference beam passes an X-axis beam passing position detector at an X-axis slider position xc;

zbc(xc): a z-directional beam passing position coordinate value on a detector the X-axis reference beam passes the X-axis beam passing position detector at the X-axis slider position xc;

xbc(yc): an x-directional beam passing position coordinate value on a detector when a Y-axis reference beam passes a Y-axis beam passing position detector at a Y-axis slider position yc;

zbc(yc): a z-directional beam passing position coordinate value on a detector when the Y-axis reference beam passes the Y-axis beam passing position detector at the Y-axis slider position yc;

xbc(zc): an x-directional beam passing position coordinate value on a detector when a Z-axis reference beam passes a Z-axis beam passing position detector at a Z-axis slider position zc;

ybc(zc): a y-directional beam passing position coordinate value on a detector when the Z-axis reference beam passes the Y-axis beam passing position detector at the Z-axis slider position zc;

ybr(xc): a y-directional beam passing reference position coordinate value on a detector at which the X-axis reference beam should pass the X-axis beam passing position detector at the X-axis slider position xc;

zbr(xc): a z-directional beam passing reference position coordinate value on a detector at which the X-axis reference beam should pass the X-axis beam passing position detector at the X-axis slider position xc;

xbr(yc): an x-directional beam passing reference position coordinate value on a detector at which the Y-axis reference beam should pass the Y-axis beam passing position detector at the Y-axis slider position yc;

zbr(yc): a z-directional beam passing reference position coordinate value on a detector at which the Y-axis reference beam should pass the Y-axis beam passing position detector at the Y-axis slider position yc;

xbr(zc): an x-directional beam passing reference position coordinate value on a detector at which the Z-axis reference beam should pass the Z-axis beam passing position detector at the Z-axis slider position zc;

ybr(zc): a y-directional beam passing reference position coordinate value on a detector at which the Z-axis reference beam should pass the Z-axis beam passing position detector at the Z-axis slider position zc;

yce(x): a y-directional coordinate value on a beam detector when an X-axis reference position beam is detected by an X-axis movement end beam detector;

zce(x): a z-directional coordinate value on a beam detector when the X-axis reference position beam is detected by the X-axis movement end beam detector;

xce(y): an x-directional coordinate value on a beam detector when an Y-axis reference position beam is detected by a Y-axis movement end beam detector;

zce(y): a z-directional coordinate value on a beam detector when the Y-axis reference position beam is detected by the Y-axis movement end beam detector;

xce(z): an x-directional coordinate value on a beam detector when a Z-axis reference position beam is detected by a Z-axis movement end beam detector;

yce(z): a y-directional coordinate value on a beam detector when the Z-axis reference position beam is detected by the Z-axis movement end beam detector;

yre(x): a y-directional coordinate value of a beam on a detector at which the X-axis reference position beam should be detected by the X-axis movement end beam detector;

zre(x): a z-directional coordinate value of a beam on a detector at which the X-axis reference position beam should be detected by the X-axis movement end beam detector;

xre(y): an x-directional coordinate value of a beam on a detector at which the Y-axis reference position beam should be detected by the Y-axis movement end beam detector;

zre(y): a z-directional coordinate value of a beam on a detector at which the Y-axis reference position beam should be detected by the Y-axis movement end beam detector;

xre(z): an x-directional coordinate value of a beam on a detector at which the Z-axis reference position beam should be detected by the Z-axis movement end beam detector;

yre(z): a y-directional coordinate value of a beam on a detector at which the Z-axis reference position beam should be detected by the Z-axis movement end beam detector.

The movement error calculating portion 3 calculates a movement error in the three-dimensional coordinate position by synthesizing the movement condition of the three-dimensional coordinate position detected as the displacement of the movement position of each movement axis from the movement reference position of the other two axes. When the three-dimensional coordinate position is set as P(xc, yc, zc), an X-directional movement error Ex at a position P is a function of Dx(yc) and Dx(zc) and is expressed as follows:

$$Ex = Fxy(xc, yc, zc)Dx(yc) + Fxz(xc, yc, zc)Dx(zc)$$

Here, Fxy(xc, yc, zc) is a function indicating the degree of influence exerted by an X-directional displacement Dx(yc) on the synthesized x-directional movement error depending on a Y-axis position (yc) of the position (xc, yc, zc). Also, Fxz(xc, yc, zc) is a function indicating the degree of influence exerted by an X-axis directional displacement Dx(zc) on the synthesized x-directional movement error depending on Z-axis position (zc) at the position (xc, yc, zc). These functions are determined by considering the slider movement mechanism, the set position of the movement condition detecting portion 2 and further a machine spatial structure (geometrical structure) including the movement mechanism. To simplify the description, hereinafter the degree of influence exerted by the position is usually assumed to be 1. In this case, the synthesized x-directional movement error Ex is expressed as a simple arithmetic sum.

$$Ex = Dx(yc) + Dx(zc)$$

In the same manner, the y-directional and z-directional movement errors can be expressed as follows:

$$Ey = Dy(zc) + Dy(xc)$$

$$Ez = Dz(xc) + Dz(yc)$$

The calculated movement errors are transmitted to the movement error compensating portion 4.

The movement error compensating portion 4 converts the calculated movement errors Ex, Ey and Ez to a positional error compensation quantity, which is transmitted to a position command portion. The position command portion can carry out control while continuously compensating the machine movement error by continuously adding the positional error compensation quantity to a positional command value.

In the above, the basic operation of the present invention has been described. By additionally providing a means for storing the movement condition, however, the following application is possible.

Figure 4:
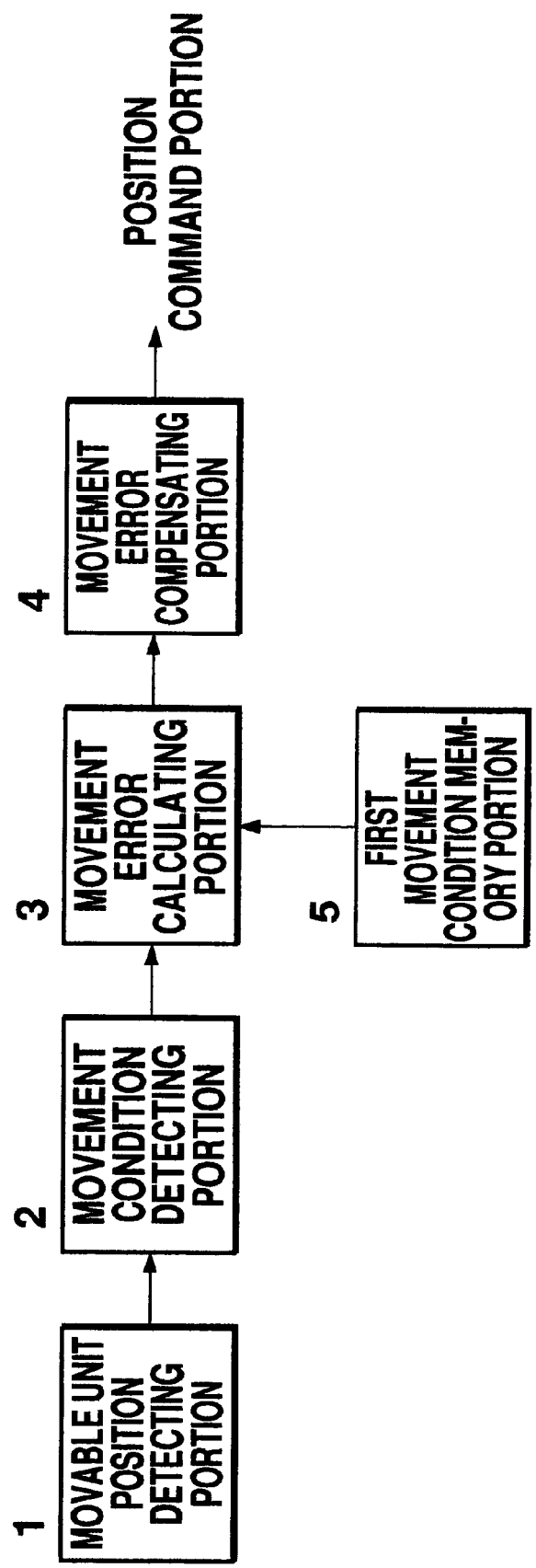
FIG. 4 is a block diagram of a second embodiment of an error compensating device in a numerical control device according to the invention.

Some types of machine tool may be manufactured so as to intentionally have a positional error relative to a reference beam. In such case, as shown in FIG. 4, the intentionally manufactured movement condition is previously stored in the first movement condition memory portion 5. At the time of machine movement, the movement condition stored in the first movement condition memory portion 5 and the movement condition continuously detected are both transmitted to the movement error calculating portion 3. The movement error calculating portion 3 calculates movement errors from these movement conditions, and the movement error compensating portion 4 makes a positional compensation. In such a constitution, the machine movement error can be controlled while being continuously compensated so that the positional error intended at the time of manufacture is maintained.

Figure 5:
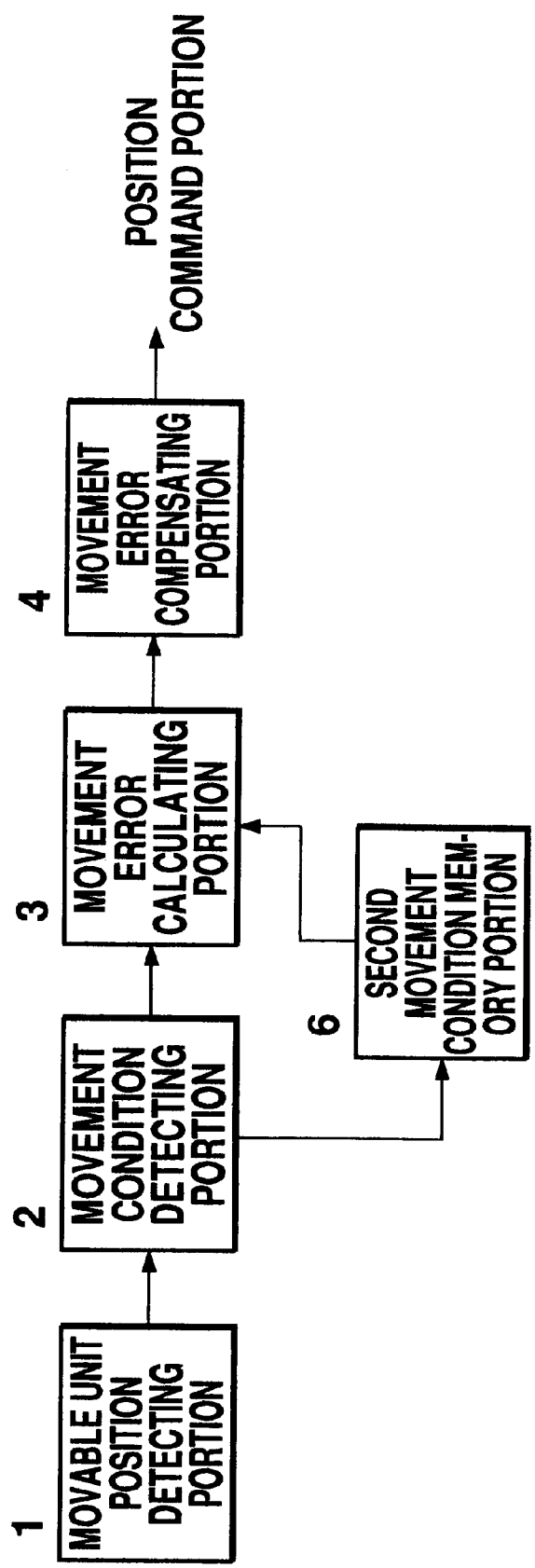
FIG. 5 is a block diagram of a third embodiment of an error compensating device in a numerical control device according to the invention.

In a method shown in FIG. 5, the movement position and the movement condition transmitted from the movement condition detecting portion 2 are stored as required in a second movement condition memory portion 6. The movement error calculating portion 3 calculates movement errors based on the continuously detected movement condition transmitted from the movement condition detecting portion 2 and the movement condition stored in the second movement condition memory portion 6, and the movement error compensating portion 4 performs a positional compensation.

In this method, when a large number of parts having the same configuration are machined, the movement condition at the time of first parts machining is stored in the second movement condition memory portion 6, and at the time of subsequent parts machining the machine movement error can be continuously compensated for control using the movement condition previously stored in the second movement condition memory portion 6 and the continuously detected movement condition in order to maintain the positional error at the time of the first parts processing.

Further, it is possible to use in combination the first movement condition memory portion 5 for storing the movement condition beforehand and the second movement condition memory portion 6 for storing the movement condition as required.

Figure 6:
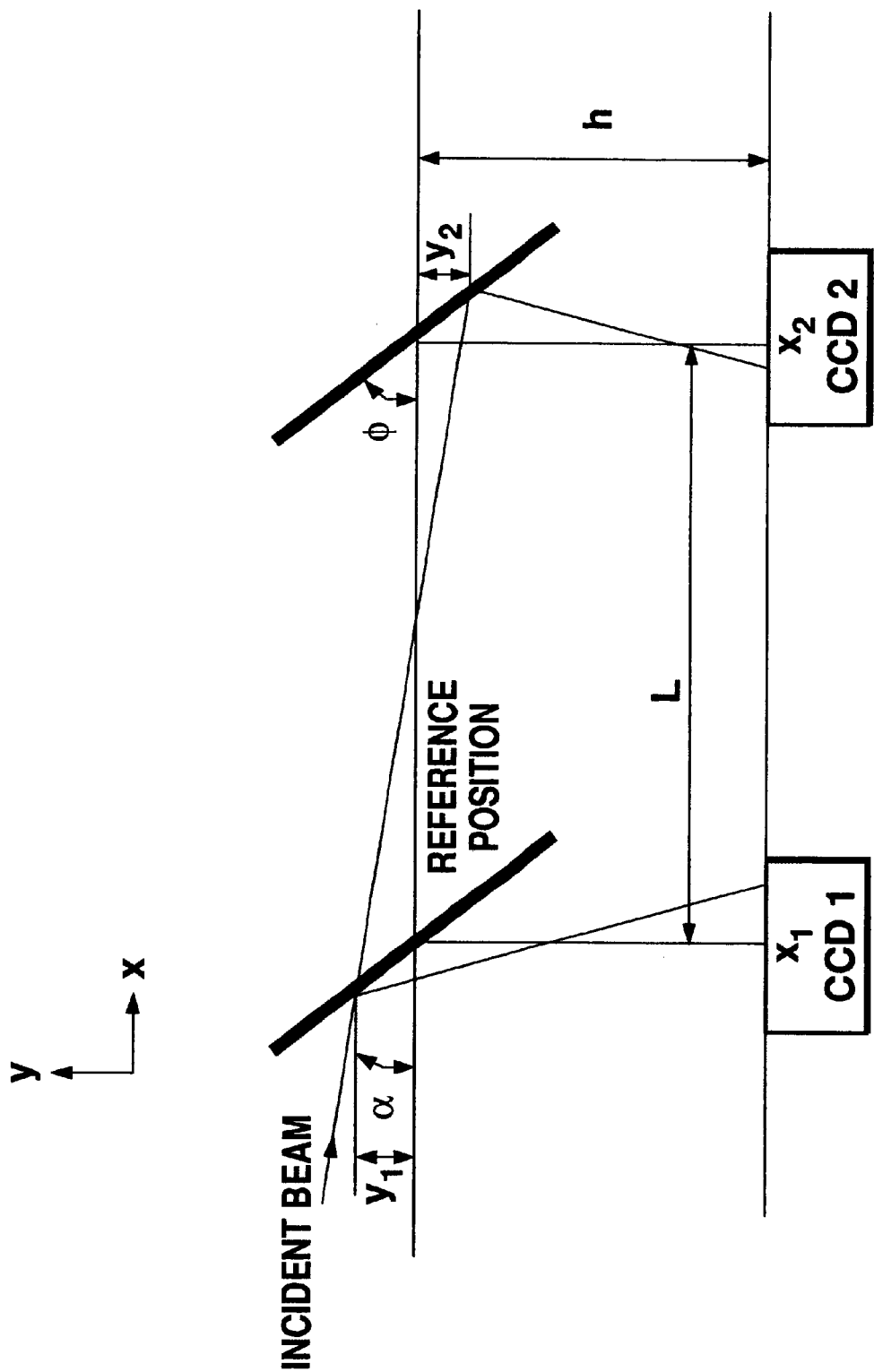
FIG. 6 shows an embodiment of a two-dimensional detecting element of a beam passing type according to the present invention.

Also, the embodiment in which deviation from the movement reference position of each movement axis is detected has been described using FIG. 3. Further, as shown in FIG. 6, by attaching two two-dimensional CCDs, torsion can be detected from the movement reference axis relative to the movement axis. That is to say, the movement condition detecting portion 2 calculates a torsion α and deviations y1 and y2 using the following equations (1), (2) and (3) based on x1, x2 detected by CCD1 and CCD2, and transmits the torsion and deviation as the movement condition to the movement error calculating portion 3.

$$\tan \alpha = (y1+y2)/(L+(y1+y2)\cdot an\ \phi) \quad \text{Equation (1)}$$

$$y1 = (h?\ \tan \alpha - x1)/(\tan \phi - \tan \alpha) \quad \text{Equation (2)}$$

$$y2 = (h?\ \tan \alpha - x2)/(\tan \phi - \tan \alpha) \quad \text{Equation (3)}$$

The movement error calculating portion 3 calculates movement errors based on the detected torsion and deviation. For example, an arithmetic function for calculating a y-directional movement error Ey using the above-mentioned α, y1 and y2 as parameters is set and stored to calculate a y-directional movement error Ey based on α, y1 and y2 continuously detected by the movement condition detecting portion 2 accompanying the X-axis movement. This can apply to the z-directional movement error Ez accompanying the movement along the X axis, the x-directional and z-directional movement errors Ex and Ez accompanying the movement along the Y axis, and the x-directional and y-directional movement errors Ex and Ey accompanying the movement in the Z direction.

Possibility of Industrial Utilization

As described above, according to the present invention, since calibration is performed during the usual machine operation, the latest movement error can be grasped during the machine operation. Based on the error, the movement error can be compensated, thereby minimizing the machine operation error.

Also, since the usual machine operation does not need to be stopped for a calibrating and verifying operation, the machine operation rate can be remarkably improved compared with the prior art.

Further, since the measuring apparatus is built into the numerical control machine tool and can always be used without performing a setup operation, there is no need to set up the measuring apparatus on the machine tool every time calibration is required and remove the measuring apparatus from the machine tool after the measuring operation is completed.

Moreover, light propagation is used as a measurement principal, and the measurement of distances based on light wavelengths is not used as a principle. Therefore, measurement accuracy is not affected by temperature, air turbulence, humidity or the like. The measurement can be remarkably easily used even in the general factory environment during the usual operation of the machine tool.

What is claimed is:

1. An error compensating device in a numerical control machine tool, comprising:

movable unit position detecting means for detecting a position along a predetermined control axis, wherein a movement of a movable unit is controlled along the control axis;

movement condition detecting means for detecting a movement condition of the movable unit in three dimensions in space in response to the position detected by the movable unit position detecting means;

movement error calculating means for calculating a machine movement error by the use of the movement condition; and movement error compensating means for compensating for the machine movement error on the basis of the machine movement error.

2. The error compensating device as claimed in claim 1, further comprising first movement condition memory means for previously storing the movement condition to be detected by the movement condition detecting means and wherein the movement error calculating means has a function of calculating the movement error from a difference between the movement condition stored in the first movement condition memory means and the movement condition at a present time.

3. The error compensating device, as claimed in claim 1, further comprising second movement condition memory means for storing, as required, the movement condition detected by the movement condition detecting means and wherein the movement error calculating means has a function of calculating the movement error from a difference between the movement condition stored in the second movement condition memory means and the movement condition at a present time.

4. The error compensating device, as claimed in claim 1 wherein the movement error compensating means has a function of performing continuous compensation of the machine movement error by adding an error compensation quantity to a position command value.

5. The error compensating device as claimed in claim 1, wherein the movement condition detecting means detects displacement of the movable unit at a specific point in a direction of a movement axis from a movement basis on a coordinate axis different from the movement axis, and the movement error calculating means calculates the movement error on the basis of the detected displacement.

6. The error compensating device as claimed in claim 5 wherein the movement condition detecting means includes:

a reference position beam generator installed to generate a reference position beam in parallel with the direction of the movement axis, and at least one movable unit two-dimensional detecting element installed on the movable unit for detecting the displacement from the movement basis on the coordinate axis different from the movement axis by the use of the reference position beam from the reference position beam generator.

7. The error compensating device, as claimed in claim 6 wherein there are two movable unit two-dimensional detecting elements on the movable unit for detecting the torsion of the movable unit along the movement axis based on the displacements from the movement basis which are separately detected at the two movable unit two-dimensional detecting elements installed on the movable unit.

8. The error compensating device, as claimed in claim 6, wherein a movement end two-dimensional detecting element for setting and adjusting the reference position beam is arranged at a movement end so as to be opposite to the reference beam generator.

9. The error compensating device as claimed in claim 6, wherein the at least one movable unit two-dimensional detecting element has a function of allowing the reference position beam to pass therethrough and a function of detecting a two-dimensional position through which the beam passes.

10. The error compensating device, as claimed in claim 6, wherein the movable unit two-dimensional detecting element is a two-dimensional CCD and a beam splitter.

* * * * *